(12) United States Patent
Draper et al.

(10) Patent No.: US 6,379,831 B1
(45) Date of Patent: Apr. 30, 2002

(54) EXPANDED NICKEL SCREEN ELECTRICAL CONNECTION SUPPORTS FOR SOLID OXIDE FUEL CELLS

(75) Inventors: Robert Draper, Pittsburgh; Ronald F. Antol, North Huntingdon; Paolo R. Zafred, Murrysville, all of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 92 days.

(21) Appl. No.: 09/631,096

(22) Filed: Aug. 3, 2000

(51) Int. Cl.$^7$ .............................. H01M 8/10; H01M 2/24
(52) U.S. Cl. ..................... 429/31; 429/147; 429/135; 429/133; 429/146; 429/158; 429/160; 429/161; 429/129; 429/145; 429/30; 429/32
(58) Field of Search ..................... 429/30, 147, 135, 429/132, 133, 146, 158, 160, 161, 129, 145, 31, 32

(56) References Cited

U.S. PATENT DOCUMENTS 4,748,091 A * 5/1988 Isenberg ..................... 429/31
6,001,501 A * 12/1999 Collie ......................... 429/31
6,296,962 B1 * 10/2001 Minh .......................... 429/38

* cited by examiner

*Primary Examiner*—Stephen Kalafut
*Assistant Examiner*—Angela J. Martin

(57) ABSTRACT

A solid oxide fuel assembly is made, wherein rows (14, 24) of fuel cells (16, 18, 20, 26, 28, 30), each having an outer interconnection (36) and an outer electrode (32), are disposed next to each other with corrugated, electrically conducting expanded metal mesh (22) between each row of cells, the corrugated mesh (22) having top crown portions (40) and bottom shoulder portions (42), where the top crown portion (40) contacts outer interconnections (36) of the fuel cells (16, 18, 20) in a first row (14), and the bottom shoulder portions (42) contacts outer electrodes (32) of the fuel cells in a second row (24), said mesh electrically connecting each row of fuel cells, and where there are no metal felt connections between any fuel cells.

11 Claims, 4 Drawing Sheets

EXPANDED NICKEL SCREEN ELECTRICAL CONNECTION SUPPORTS FOR SOLID OXIDE FUEL CELLS

GOVERNMENT CONTRACT

The Government of the United States of America has rights in this invention pursuant to Contract No. DE-FC-2697FT34139, awarded by the United States Department of Energy.

BACKGROUND OF THE INVENTION

1. Field of the Invention

This invention relates generally to strong, porous, thin improved electrical connectors and supports for tubular solid oxide electrolyte fuel cells in a fuel cell generator.

2. Background Information

Square pitched, series-parallel interconnection of solid oxide fuel cells is well known, and taught in U.S. Pat. Nos. 4,490,444 and 4,833,045 (Isenberg and Pollack et al., respectively). The fuel cells used usually contain a self-supported air electrode tube, where the air electrode is covered over about 300 degrees by a solid electrolyte film. Thus, there is a 60 degree wide axial strip down the length of the cell. This remaining 60 degrees of air electrode surface is covered by an interconnection strip, usually a lanthanum-chromite. As a top layer, fuel electrode covers the solid electrolyte over about 280 degrees of the electrolyte surface.

These cylindrical cells are placed in a square pitch, series-parallel connected array, wherein the air electrode of one cell is connected to the fuel electrode of the adjacent series-connected cell by a plated interconnection strip and a strip of 80% to 95% porous sintered nickel felt, which is about 0.1 inch (0.25 cm) thick. Other nickel felts provide parallel connections between the fuel electrodes of adjacent cells. The series path is essential for the generation of a practical DC stack voltage. The parallel connections provide paths by which the current can circumnegotiate any defective open circuit cells. Fuel flows axially in the passages forced between the groups of cells. This has been the standard design for over fifteen years.

In this standard design, the primary subassemblies from which a solid oxide fuel cell generator is formed are cell bundles. Presently, bundles contain twenty-four cells on a 8×3 cell matrix. Eight cells are series connected to form one row of a three-row bundle. The three rows are connected in parallel through the connection of each cells in the row with the adjacent cell in the next row. Between the nickel plated lanthanum-chromite interconnection strip of one cell and the nickel fuel electrode of the next cell in a row, any two cells are presently series connected by a nickel felt of a rectangular cross-section (approximately 6.3 mm×6.3 mm). These felts are pressed to a thickness of between about 0.1 inch (0.25 cm) and about 0.25 inch (0.63 cm) and are initially about 80% to 95% porous. Parallel connection is also currently accomplished by similar felt strips. In this case, the felts connect the fuel electrodes of adjacent cells. Along the length of a cell, eight felts of 185-mm length are used to form a series connection, and four felts of 185-mm length are used to accomplish a parallel connection. A total of 280 felt strips are used per bundle. This means of electrical connection is effective; however, it is costly in terms of materials and is very labor intensive. Furthermore, this arrangement is not conducive to automation.

Improvements to this standard design have been suggested. Reichner, in U.S. Pat. No. 4,876,163, disclosed spiral or folded row connections within a cylindrical generator, using U-shaped connections. This design, however, substantially decreases gaseous fuel flow between the outer electrodes of the cells. U.S. Pat. No. 5,273,838 (Draper et al.) eliminated one nickel felt connector from each group of four cells, where alternate cells of a first row had no electrical connection of their interconnections to cells in an adjacent row. This design helped to eliminate the potential for bowing when using newer, longer one meter cells. This design may, however, decrease the overall strength of the twenty-four cell subassemblies.

In an attempt to simplify generator design and reduce assembling costs, DiCroce et al., in U.S. Pat. No. 5,258,240, taught a thick, flat-backed, porous metal fiber felt connector strip, having a crown portion of metallic fiber felt conforming to the surface of its contacting fuel cell. These porous felt connectors could be used as a series of thin strips across a small part of the fuel cell length, or as a porous sheet extending along the entire axial length of the fuel cells. In order to provide structural integrity, since there are no side connections, a plurality of cells would have to be laminated to provide a thickness of 0.125 inch (0.62 cm), thereby reducing porosity to about 5 to 10%. The strips could also be made of a solid nickel foil or a composite of foil and porous felt; they could also have two opposing fuel cell conforming surfaces, as shown in FIG. 3 of that patent.

The use of fibrous felts still allowed potential densification during prolonged use. Additionally, it was difficult to fashion such felts to exact dimensions, and the felts retailed a springiness. Conversely, the use of foils did not provide adequate strength, and prevented the required infiltration of the bundle with hot air during the drying process, which is an important feature of bundle manufacture.

What is needed is a highly porous nickel support made of a single piece, across a horizontal fuel row, to conform to and support all contacting fuel cells, as well as to connect all contacting fuel cells electrically. The support must be strong, but it must also be possible to introduce the desired flexibility by selection of an appropriate form or shape.

SUMMARY OF THE INVENTION

Therefore, it is a main object of this invention to provide a thin, strong, porous electrical connector and support for tubular solid oxide electrolyte fuel cells in a fuel cell generator.

It is also a main object of this invention to provide an improved method of connecting and supporting fuel cells in a fuel cell generator.

These and other objects of the invention are accomplished by providing a solid oxide fuel cell assembly comprising rows of fuel cells, each having an outer interconnection and an outer electrode, disposed next to each other with corrugated electrically conducting metal mesh between each row of cells, the corrugated mesh having a top crown portion and a bottom shoulder portion, where the crown portion contacts the outer interconnections of the fuel cells in a first row, and the shoulder portion contacts the outer electrodes of the fuel cells in a second row, said mesh electrically connecting each row of fuel cells, and where there are no metal felt connections between any fuel cells.

The invention also comprises a solid oxide fuel cell assembly comprising a first row of spaced apart, axially elongated tubular fuel cells, each containing an outer electrode and an outer interconnection; a second row of spaced apart, axially elongated tubular fuel cells, each containing an outer electrode and an outer interconnection, the second row being spaced apart from the first row, where all the outer interconnections of the first row fuel cells face all the outer electrodes of the second row fuel cells; and an electrically conducting connector support for the fuel cells, extending between and contacting the first row and the second row of fuel cells, where the connector support consists of an expanded mesh more than about 60% porous and having a thickness between 0.025 cm (0.01 inch) and 0.076 cm (0.03 inch), said connector support having a corrugated structure with a series of top crowns connected to bottom shoulder sections, where the crowns and shoulder sections conform to the shape of their contacting tubular fuel cells, where each shoulder section is connected to its adjacent shoulder section, where all of the top crowns contact the interconnections of the first row fuel cells and all of the shoulder sections contact the outer electrodes of the second row fuel cells, and where there are no metal felt connections between any fuel cells. In some embodiments, the sides of the crown portion and the connection between shoulder portions will also be corrugated, so as to provide additional flexibility or springiness to the assembly. Preferably, the connector support is made of nickel.

The invention also comprises a method of manufacturing a solid oxide fuel cell assembly, comprising the steps of: (1) providing a first and second row of spaced apart, axially elongated tubular fuel cells, the second row being spaced apart from the first row, each fuel cell containing an outer electrode and an outer interconnection, where all the outer interconnections of the first row fuel cells face all the outer electrodes of the second row fuel cells; (2) providing a flat sheet of expanded nickel mesh having a porosity over about 60% and a thickness between 0.025 cm and 0.076 cm; (3) heating the expanded nickel mesh to make it formable; (4) forming the heated, flat, expanded nickel mesh sheet into a corrugated structure with a series of top crowns connected to the bottom shoulder sections to provide a connector support, where the forming returns the strength and temper to the nickel mesh, and where the crowns and shoulder sections will conform to the shape of the tubular fuel cells of the first and second rows of fuel cells; (5) adding an organic adhesive mixed with nickel powder to the crowns and shoulder portions of the corrugated nickel mesh connector support; (6) disposing the adhesive-containing corrugated connector support between the first and second rows of fuel cells, such that all of the connector support top crowns contact and adhere to the interconnections of the first row fuel cells and all of the connector support shoulder sections contact and adhere to the outer electrodes of the second row fuel cells; (7) drying the adhesive by passing hot air through the porous connector support; and (8) sintering the fuel cell assembly to vaporize the organic portion of the adhesive and provide an integral fuel cell assembly. The sintering can be accomplished during manufacture of a cell bundle or during startup of a fuel cell generator containing the assembly. Epoxy resin has been found to vaporize easily and provides no ill effects on the fuel cell components. Additionally, the sections between crown top and shoulder are corrugated for increased flexibility.

This provides a very porous, ultra thin, and extremely tough electrical connector support for tubular solid oxide fuel cells, allowing elimination of hand labor, reducing total parts for a 24-cell bundle by over 80% and cutting production time by 90%, as well as allowing automated assembly.

BRIEF DESCRIPTION OF THE DRAWINGS

In order that the invention can be more clearly understood, convenient embodiments thereof will now be described, by way of example, with reference to the accompanying drawings, in which.

DESCRIPTION OF THE PREFERRED EMBODIMENTS

In the preferred practice of the present invention, natural gas or an incompletely combusted gas is employed as a fuel gas on the plenum side of a solid oxide fuel cell (SOFC) generator. Air is preferably employed as an oxidizing gas flowing within the tubular fuel cells. Also, other fuel gas and oxidizing gases may be employed in place of natural gas and air.

Figure 1:
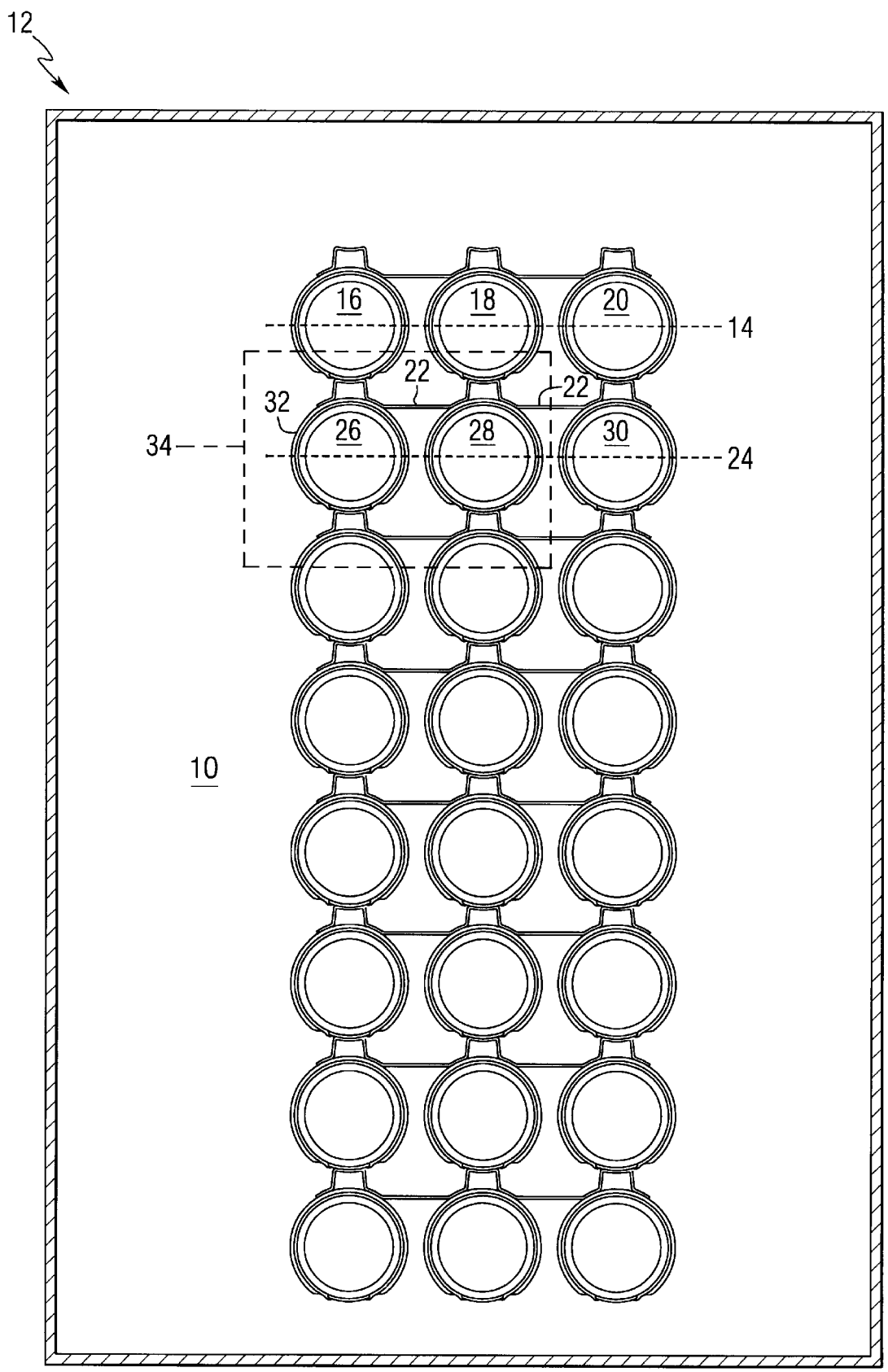
FIG. 1 is a cross-sectional view of one embodiment of the fuel cell assembly or bundle of this invention.

FIG. 1 shows an 8×3 cell bundle array of fuel cells in the plenum 10 of a generator 12 embodying the present invention. The array comprises rows of fuel cells, such as, for example, a first row 14 including fuel cells 16, 18 and 20, which are electrically connected in parallel by an electrically conducting member 22 extending between cells (shown in FIG. 2). Fuel cells 16, 18 and 20 are also electrically connected in series with the fuel cells in the adjacent second row 24, including fuel cells 26, 28 and 30, by the member 22 (shown more clearly in FIG. 2).

Figure 2:
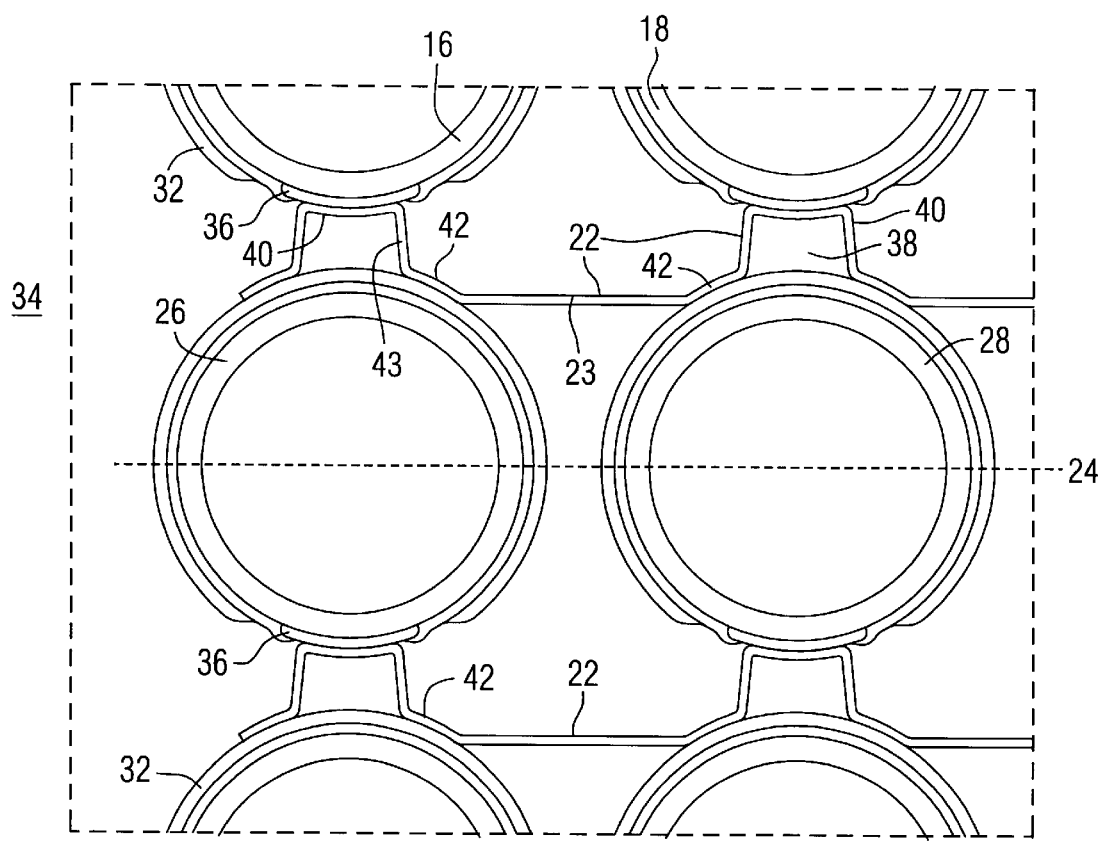
FIG. 2 is a detailed cross-sectional view of a part of the bundle of FIG. 1.

FIG. 2 shows in more detail the group of cells 34 shown within the dotted lines of FIG. 1. The conducting member 22 is a thin sheet of porous, corrugated nickel which contacts the outer electrodes 32 of the cells 26 and 28 in the second row 24, and the outer interconnect material 36 of the cells 16 and 18 in the first row 14. Also shown is the hollow, unfilled volume 38 between the interconnect material 36 and the outer electrodes 32 within the crown portion 40 of the corrugated conducting member 22, which functions as a connector support.

Figure 5:
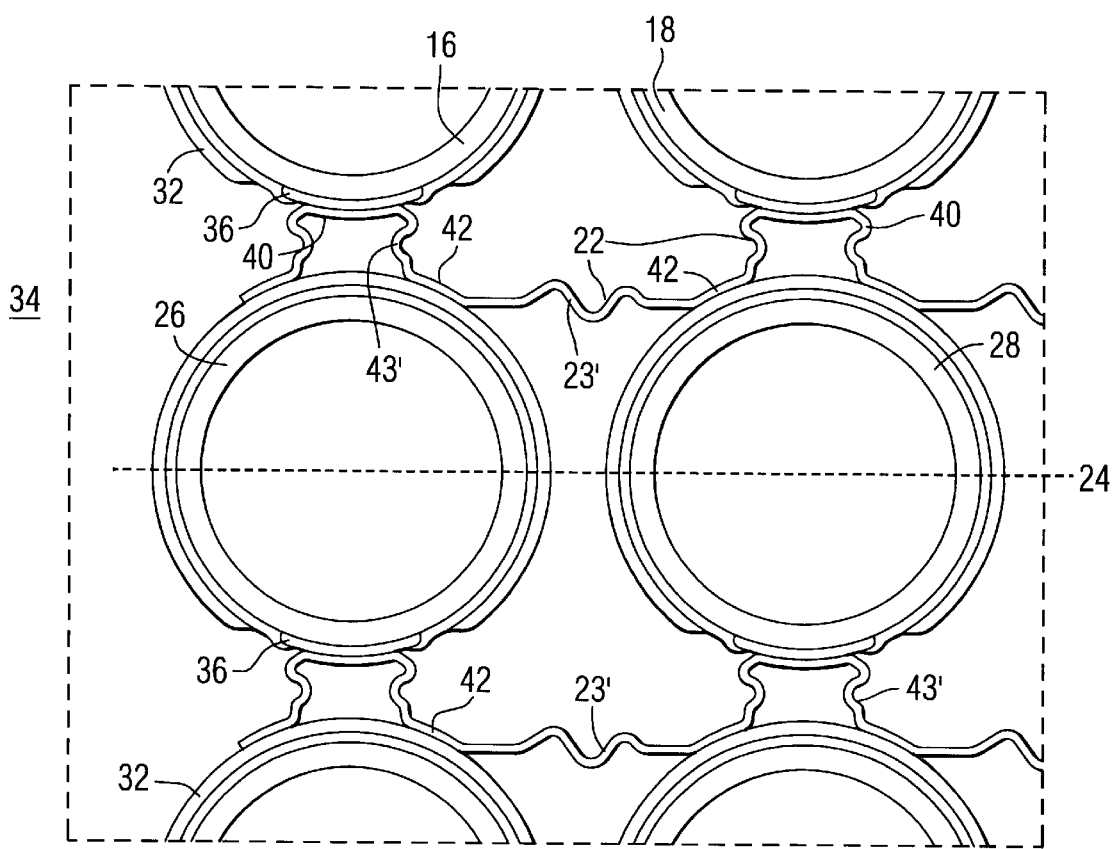
FIG. 5 is an alternate embodiment of FIG. 2, showing the corrugated structure of the invention, having additional S-shaped corrugations between the top of the crown at the crown sides and in the length between shoulder portions.

The corrugated connector support conducting member 22 also has bottom shoulder sections 42 connected to the top crowns 40 by crown sidewall 43 (shown here as a straight sidewall), where the crowns and shoulder sections conform to the shape of their contacting tubular fuel cells, and each shoulder section 42 is connected to its adjacent shoulder section by shoulder connector 23 (shown here as a straight section). The sections connecting the crown and shoulder can be straight, giving rigidity to the structure, or corrugated (as shown in FIG. 5) to promote flexibility of the bundle. Also, all of the outer interconnections 36 of the first row 14 of fuel cells, such as 16 and 18, face all of the outer electrodes of the second row 24 of fuel cells, such as 26 and 28. As shown, there are no metal felt connections between any fuel cells.

Figure 3:
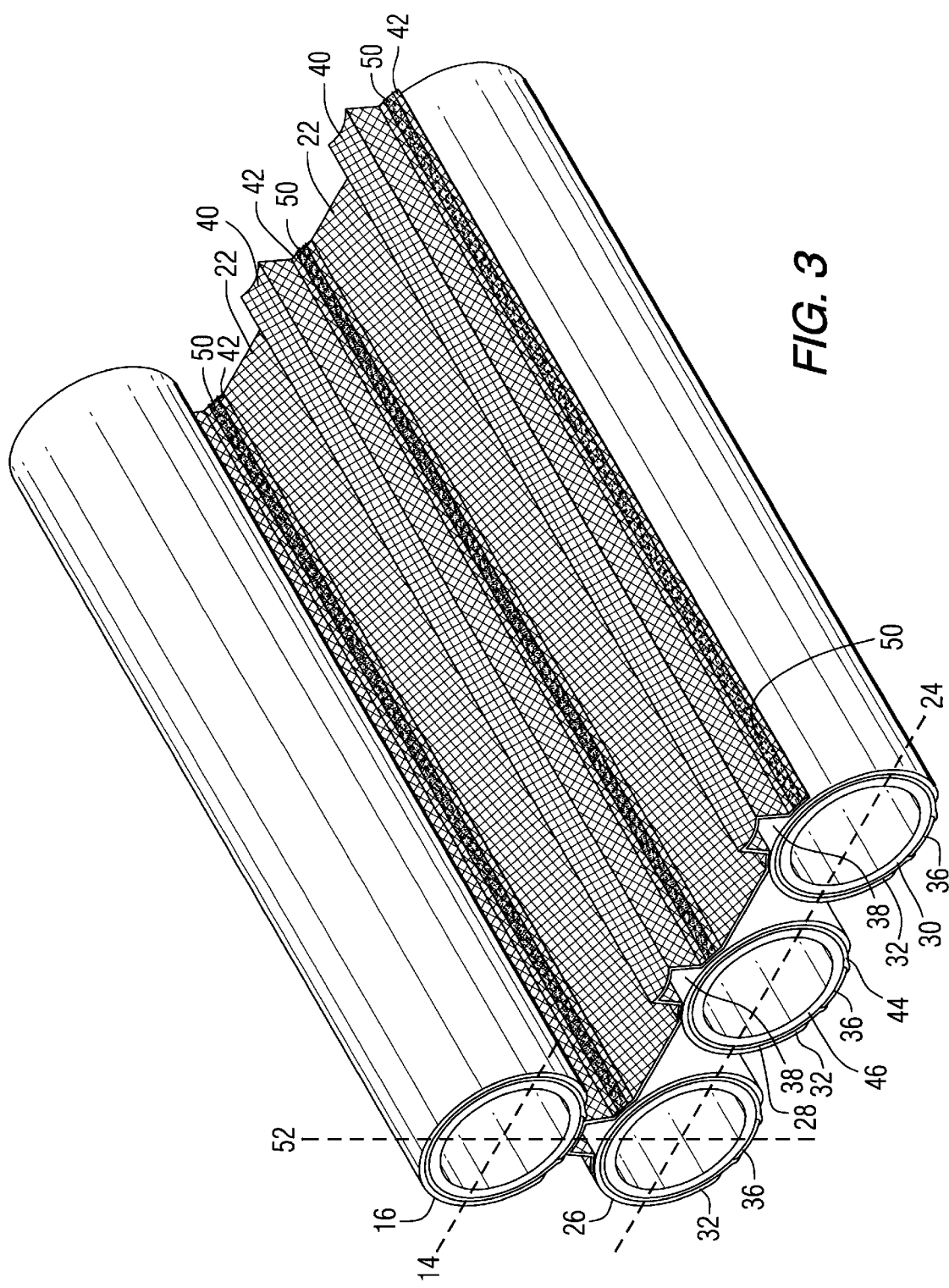
FIG. 3, which best embodies the invention, is a three-dimensional, cross-sectional view of the corrugated structure of this invention, disposed between a first row and a second row of fuel cells.

FIG. 3 more clearly shows the character of the corrugated connector support conducting member 22, with straight sections between crown and shoulder, as well as between shoulders, as shown in FIG. 2. As shown in FIG. 3, fuel cell 16 is part of the first row 14 of spaced apart, axially elongated tubular fuel cells (not shown here in any detail, for the sake of simplicity, except of fuel cell 28 of the second row 24). All of the fuel cells—as shown by fuel cell 28—comprise an inner self-supported air electrode 46, a solid electrolyte 44 (which is oxygen ion conductive at over 1000° C.), an outer fuel electrode 32 and an outer interconnection 36. Spaced apart from the first row 14 of cells (here represented by cell 16) is a second row 24 of cells 26, 28, and 30, all the cells containing outer electrodes 32 and outer interconnections 36. All of the interconnections 36 of the first row 14 of cells face all of the outer electrodes 32 of the second row 24 of cells. Thus, the interconnection of cell 16 will face the outer electrode of cell 26 within each column 52 of cells. The electrically conducting connector support 22 extends between and contacts the first row 14 and second row 24 of cells, such that the top crowns 40 contact the interconnections 36 and the shoulder sections 42 contact the outer electrodes 32.

The corrugated connector support conducting member 22 consists of a strong expanded mesh, preferably of nickel, which is over about 60% porous, preferably 65% to 80% porous, having a thickness between 0.025 cm (0.01 inch) and 0.076 cm (0.03 inch), preferably from 0.025 cm (0.01 inch) to 0.05 cm (0.02 inch). Over the 0.05 cm to 0.076 cm range, the expanded mesh becomes very difficult to corrugate to form crowns and shoulder portions. Under 0.025 cm, structural integrity suffers. The mesh must be at least 60% porous, so that fuel can pass easily outside the cells near the fuel electrodes 32, as well as to enable drying of the nickel particle-filled organic-based adhesive, shown as 50, which is used initially to bond the conducting member 22 to each row of fuel cells. The organic part of the adhesive, preferably an epoxy resin filled with about 40 wt. % to 80 wt. % fine nickel particles, is burned off (or vaporized) during a subsequent heating/sintering step at about 1000° C. to 1200° C., prior to or after the fuel cell bundle is placed in the generator, that is, such sintering can occur at generator startup. Epoxy resin volatiles, in particular, have been found to have no adverse effect on fuel cell properties.

The corrugated connector support conducting member 22 has a spring-like effect and provides superior shock absorbing qualities, as compared to metal felts. Additionally, the member 22 is not affected by prolonged operation of twelve months or more at temperatures up to 1200° C. and will not shrink or slump (that is, density and decrease in thickness), as will metal felts. This is a feature of the invention, since the prevention of shrinkage of the bundle eliminates the present tendency of the cells to break fragile ceramic upper cell positioning boards.

Also, during fabrication of the test assemblies, it appeared to be easier to avoid shorting between the interconnection and the fuel electrode of a single cell when using mesh, rather than metal felts. Other benefits of this invention over current practice include: the total number of parts for a 24-cell bundle (including cells) is reduced from 440 to 60; manual assembly of a bundle using mesh takes less than half the time required for that of a bundle using felts; the mesh bundle design is much more conducive to automation of the assembly process that is the felt bundle design; when automated, the mesh bundle assembly will be accomplished in one-tenth the time presently consumed in assembling a felt bundle; the cost of mesh, including raw materials and formation, is approximately one-tenth that of felts; and cell-to-cell electrical conductivity is higher with mesh than with felts.

Figure 4:
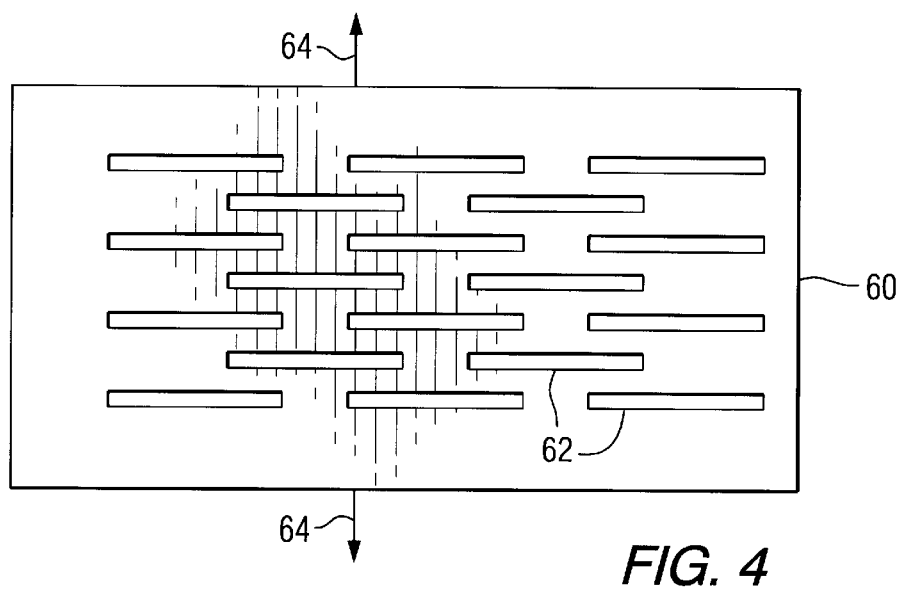
FIG. 4 is a top view of a cut out sheet of metal before being diagonally expanded to form an expanded sheet, which can then be formed to make the thin corrugated structure of this invention.

FIG. 4 shows the initial slicing of nickel foil 60 to form spaced apart, long rectangular slits 62 through the foil. The foil 60 is then expanded, as shown by the arrows 64, to provide the porous, expanded, diamond-shaped mesh structure shown in FIG. 3. At this point, the open mesh is work hardened and must usually be softened, generally by annealing (normally by heating at between about 600° C. and 1200° C.) to recrystallize the grain structure and soften the mesh, so that it can be roll-formed into the corrugated structure shown in FIG. 3. The processing to form a corrugated structure again work hardens portions of the mesh, making it stiff, yet resilient, and very strong, yet porous.

Finally, FIG. 5, which has been discussed previously, shows a very flexible, completely corrugated metal mesh connector support for fuel cells, where the crown sidewall 43', connecting the top of the crown to the shoulder, and/or the shoulder connector 23', connecting one shoulder to another, are also corrugated, the corrugations being S-, multiple S- or Z-shaped, as shown. This design combines the strength of the mesh with the flexibility of a felt.

EXAMPLE

Expanded nickel mesh, having diamond-shaped openings, about 65% porous and 0.05 cm (0.02 inch) thick, was annealed and then placed in a die mold having a corrugated structure with a crown contour approximated to fit the contour of tubular solid oxide fuel cells to be made into a bundle similar to that shown in FIG. 1. Each corrugated mesh structure was coated at the crown and shoulder with a bead of epoxy cement admixed with about 20 wt. % small nickel particles, as shown in FIG. 3. The molded mesh was then layered between rows of three fuels cells, to contact interconnections and fuel electrodes (as shown in FIG. 2), making columns eight fuel cells high. Hot air was blown through the spaces between the cells and into the spaces within the crowns of the mesh to dry the epoxy. The bundle was then placed in a sintering oven at 1100° C. for two hours to vaporize the epoxy and form a nickel particle-to-mesh bond. Upon cooling, the bundle was tested and found to have excellent performance. The epoxy vaporization did not have any apparent adverse effect on electrical properties. The mesh provided a strong, resilient conducting member connecting and supporting the fuel cells. Neither the sections of mesh between shoulders and crown, nor the mesh between adjacent shoulders, incorporated the S-, multiple S- or Z-shaped corrugation of FIG. 5; however, these features could easily be added by an additional roll forming step.

What is claimed is:

1. A solid oxide fuel cell assembly comprising rows of fuel cells, each having an outer interconnection and an outer electrode, disposed next to each other with corrugated electrically conducting metal mesh between each row of cells, the corrugated mesh having a top crown portion and a bottom shoulder portion, where the crown portion contacts the outer interconnections of the fuel cells in a first row, and the shoulder portion contacts the outer electrodes of the fuel cells in a second row, said mesh electrically connecting each row of fuel cells, and where there are no metal felt connections between any fuel cells.

2. A solid oxide fuel cell assembly comprising:
   (1) a first row of spaced apart, axially elongated tubular fuel cells, each containing an outer electrode and an outer interconnection;
   (2) a second row of spaced apart, axially elongated tubular fuel cells, each containing an outer electrode and an outer interconnection, the second row being spaced apart from the first row, where all the outer interconnections of the first row fuel cells face all the outer electrodes of the second row fuel cells; and (3) an electrically conducting connector support for the fuel cells, extending between and contacting the first row and the second row of fuel cells, where the connector support consists of an expanded mesh more than about 60% porous and having a thickness between 0.025 cm and 0.076 cm, said connector support having a corrugated structure with a series of top crowns connected to bottom shoulder sections, where the crowns and shoulder sections conform to the shape of their contacting tubular fuel cells, where each shoulder section is connected to its adjacent shoulder section, where all of the top crowns contact the interconnections of the first row fuel cells and all of the shoulder sections contact the outer electrodes of the second row fuel cells, and where there are no metal felt connections between any fuel cells.

3. The solid oxide fuel assembly of claim 2, wherein the connector support is made of nickel.

4. The solid oxide fuel assembly of claim 2, wherein the connector support has diamond-shaped openings.

5. The solid oxide fuel assembly of claim 2, wherein the connector support is from 65% to 80% porous.

6. The solid oxide fuel assembly of claim 2, wherein the connector support is from 0.025 cm to 0.05 cm thick.

7. The solid oxide fuel assembly of claim 2, wherein the connector support has a spring-like effect providing shock resistance to the fuel cells.

8. The solid oxide fuel assembly of claim 2, wherein the crown sidewall between crown top and shoulder is also corrugated.

9. The solid oxide fuel assembly of claim 2, wherein the shoulder connector between adjacent shoulder sections is also corrugated.

10. The solid oxide fuel assembly of claim 2, wherein the connector support will not shrink or slump during prolonged operation at temperatures of up to 1200° C.

11. A method of manufacturing a solid oxide fuel cell assembly, comprising the steps of:

(1) providing a first and second row of spaced apart, axially elongated tubular fuel cells, the second row being spaced apart from the first row, each fuel cell containing an outer electrode and an outer interconnection, where all the outer interconnections of the first row fuel cells face all the outer electrodes of the second row fuel cells;

(2) providing a flat sheet of expanded nickel mesh having a porosity over about 60% and a thickness between 0.025 cm and 0.076 cm;

(3) heating the expanded nickel mesh to make it formable;

(4) forming the heated, flat, expanded nickel mesh sheet into a corrugated structure with a series of top crowns connected to the bottom shoulder sections to provide a connector support, where the forming returns the rigidity to the nickel mesh, and where the crowns and shoulder sections will conform to the shape of the tubular fuel cells of the first and second rows of fuel cells;

(5) adding an organic adhesive mixed with nickel powder to the crowns and shoulder portions of the corrugated nickel mesh connector support;

(6) disposing the adhesive-containing corrugated connector support between the first and second rows of fuel cells, such that all of the connector support top crowns contact and adhere to the interconnections of the first row fuel cells and all of the connector support shoulder sections contact and adhere to the outer electrodes of the second row fuel cells;

(7) drying the adhesive by passing hot air through the porous connector support; and (8) sintering the fuel cell assembly to vaporize the organic portion of the adhesive and provide an integral fuel cell assembly.

* * * * *